(12) United States Patent
Chu et al.

(10) Patent No.: US 10,714,997 B2
(45) Date of Patent: Jul. 14, 2020

(54) OUTER ROTOR MOTOR

(71) Applicant: Johnson Electric S.A., Murten (CH)

(72) Inventors: Junjie Chu, Hong Kong (CN); Xiaobing Zuo, Shenzhen (CN); Yanfang Zhi, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 77 days.

(21) Appl. No.: 15/871,298

(22) Filed: Jan. 15, 2018

(65) Prior Publication Data

US 2018/0212485 A1    Jul. 26, 2018

(30) Foreign Application Priority Data

Jan. 20, 2017 (CN) .......................... 2017 1 0041695

(51) Int. Cl.

| H02K 5/02 | (2006.01) |
|---|---|
| H02K 1/27 | (2006.01) |
| H02K 11/33 | (2016.01) |
| H02K 5/16 | (2006.01) |
| H02K 21/22 | (2006.01) |

(52) U.S. Cl.
CPC ............ *H02K 1/2786* (2013.01); *H02K 5/02* (2013.01); *H02K 5/161* (2013.01); *H02K 11/33* (2016.01); *H02K 21/22* (2013.01)

(58) Field of Classification Search
CPC .. H02K 1/27; H02K 5/02; H02K 5/16; H02K 21/22
See application file for complete search history.

(56) References Cited

U.S. PATENT DOCUMENTS

| 6,460,382 | B1 * | 10/2002 | Kim | ...................... | D06F 37/304 |
|---|---|---|---|---|---|
| | | | | | 68/140 |
| 2015/0084475 | A1 * | 3/2015 | Ando | ...................... | H02K 1/146 |
| | | | | | 310/216.015 |
| 2016/0376741 | A1 * | 12/2016 | Kim | ...................... | H02K 21/12 |
| | | | | | 310/90 |

FOREIGN PATENT DOCUMENTS

| CN | 201994799 U | 9/2011 |
|---|---|---|
| CN | 102545458 A | 7/2012 |
| CN | 204179910 U | 2/2015 |
| CN | 204794454 U | 11/2015 |

* cited by examiner

*Primary Examiner* — Naishadh N Desai
(74) *Attorney, Agent, or Firm* — Muncy, Geissler, Olds & Lowe, P.C.

(57) ABSTRACT

An outer rotor motor includes a stator, a rotor rotatably disposed outside the stator, a mounting seat, a rotation shaft driven by the rotor, and two bearing mounted to the mounting seat to rotatably support the rotation shaft. The stator includes a stator core and a stator winding wound around the stator core. The mounting seat includes an upper bracket seated on one of opposite axial ends of the rotor, a lower bracket seated on the other axial end of the rotor, a connecting member connected between the upper bracket and the lower bracket, and a cylindrical mounting post fixed to the upper bracket. The cylindrical mounting post extends through and is fixed in the stator core. The rotation shaft is rotatably received in the mounting post. The two bearings are avoided overlapping the stator core in the axial direction.

20 Claims, 5 Drawing Sheets

OUTER ROTOR MOTOR

CROSS REFERENCE TO RELATED APPLICATIONS

This non-provisional patent application claims priority under 35 U.S.C. § 119(a) from Patent Application No. 201710041695.1 filed in The People's Republic of China on Jan. 20, 2017.

FIELD OF THE INVENTION

The present invention relates to the field of motor, and in particular to an outer rotor brushless DC motor.

BACKGROUND OF THE INVENTION

A permanent magnet brush motor usually comprises a stator and a rotor. The stator comprises a housing and permanent magnets mounted to the inner surface of the housing. The rotor comprises a rotation shaft, a magnetic core and a commutator fixed to the rotation shaft, and a rotor winding wound around the magnetic core. There exists the tooth-slot effect between the stator and the rotor. In some applications, it is expected that the motor has a larger cogging torque. For example, for roller shutter motors, it is desirable to increase the cogging torque of motor so that the motor can stop the shutter at any designated positions without additional brake devices to thereby simplify the structure and reduce the cost of the roller shutter.

A traditional outer rotor brushless DC motor is provided with a base at one end of the motor, a mounting post protrudes axially in the middle of the base and is configured for supporting the stator of the motor. The mounting post is hollow inside for the motor shaft axially passing therethrough. Two bearing housings is mounted to in the mounting post to rotatably support the motor shaft. The mounting post should be greater enough for accommodating the bearings. However, the increasing size of the mounting post will increases the difficulty of integrally forming the mounting post with the base, and leads to the increase of the radial size of the stator core. In addition, since the bearings are both mounted in the mounting post, the mounting post must be made with high strength materials to make the mounting post can completely support the rotor and a load, such as an impeller, carried by the rotor. In addition, to ensure high concentricity between the bearings disposed in the bearing seat, it is necessary to finish the mounting post. All the points aforementioned will lead to increased manufacture cost of an outer rotor motor.

SUMMARY OF THE INVENTION

Thus, there is a desire for a motor which has an increased cogging torque.

In one aspect, the present invention provides an outer rotor motor including a stator, a rotor rotatably disposed outside the stator, a mounting seat, a rotation shaft driven by the rotor, and two bearing mounted to the mounting seat to rotatably support the rotation shaft. The stator includes a stator core and a stator winding wound around the stator core. The mounting seat includes an upper bracket seated on one of opposite axial ends of the rotor, a lower bracket seated on the other axial end of the rotor, a connecting member connected between the upper bracket and the lower bracket, and a cylindrical mounting post fixed to the upper bracket. The cylindrical mounting post extends through and is fixed in the stator core. The rotation shaft is rotatably received in the mounting post. The two bearings are avoided overlapping the stator core in the axial direction.

Preferably, the upper bracket, the lower bracket and the mounting post are respectively separately formed.

Preferably, the two bearing comprises a first bearing mounted to an end of the mounting post at a side of the upper bracket away from the stator core, and a second bearing mounted to the lower bracket.

Preferably, the mounting post includes a large-diameter portion and a small-diameter portion co-axially connected with the large-diameter portion, the small-diameter portion is disposed between the upper bracket and the lower bracket, the stator core is attached to and supported on the small-diameter portion of the mounting post, the large-diameter portion of mounting post is disposed at a side of the upper bracket away from the lower bracket, the first bearing is mounted in the large-diameter portion of mounting post.

Preferably, the mounting post is made of plastics by injection molding.

Preferably, the first bearing is embedded in the mounting post by over mold.

Preferably, the upper bracket and the lower bracket are sheet-metal parts, the connecting member is made of metal or plastics.

Preferably, the upper bracket includes a plate-like main portion, two wing portions respectively extending from opposite end of the main portion in same direction perpendicular to the main portion, and two mounting flanges respectively formed at distal ends of the two wing portions; the lower bracket includes a plate-like main portion, two wing portions respectively extending from opposite end of the main portion in same direction perpendicular to the main portion, and two mounting flanges respectively formed at distal ends of the two wing portions; the connecting member is substantially annular and has two mounting stands thereon; the mounting flanges of the upper bracket, the mounting flanges of the upper bracket, and the mounting stands of the connecting member are correspondingly fixed to each other.

Preferably, each of the mounting flanges of the upper bracket and the lower bracket defines a plurality of mounting hole; each of the mounting stands defines a plurality of fixing holes, the mounting flanges of the upper bracket, the mounting flanges of the upper bracket, and the mounting stands of the connecting member are correspondingly fixed to each other by a plurality of fasteners correspondingly passing through the mounting holes of the upper bracket, the mounting holes of the lower bracket, and the fixing holes of the connecting member.

Preferably, the lower bracket defines a depression in a side of main portion of the lower bracket facing the upper bracket, and is provided with a latch member, the second bear is received in the depression, the latching member presses against a top of the second bearing to retain the second bearing in place.

Preferably, the rotor includes a rotor holder and a magnet attached to the rotor holder, the rotor holder is unrotatably connected to the rotation shaft by a locking ring.

Preferably, the rotor holder includes a magnet cylindrical mounting portion and a plate-like connecting portion connected to an end of the mounting portion, the connecting portion defines a through hole; the rotation shaft fixed in the through hole of the connecting portion with the locking ring fixedly sleeved on the rotation shaft and fastened in the through hole.

Preferably, the rotation shaft is sleeved by a sleeve having an length smaller than that of the rotation shaft, opposite ends of the rotation shaft extend out of sleeve.

Preferably, the sleeve is rotatably received in the mounting post together with the rotation shaft; an end of the sleeve extends out of the mounting post to resist against the locking ring to prevent the mounting post from contacting with the lower bracket and thereby being worn out in high speed rotation.

Preferably, the outer rotor motor further includes a control board selectively mounted to the upper bracket or the lower bracket.

Preferably, the outer rotor motor is a brushless motor.

BRIEF DESCRIPTION OF THE DRAWINGS

Below, embodiments of the present invention will be described in greater detail with reference to the drawings. It should be noted that the figures are illustrative rather than limiting, wherein.

DETAILED DESCRIPTION OF THE PREFERRED EMBODIMENTS

Figure 1:
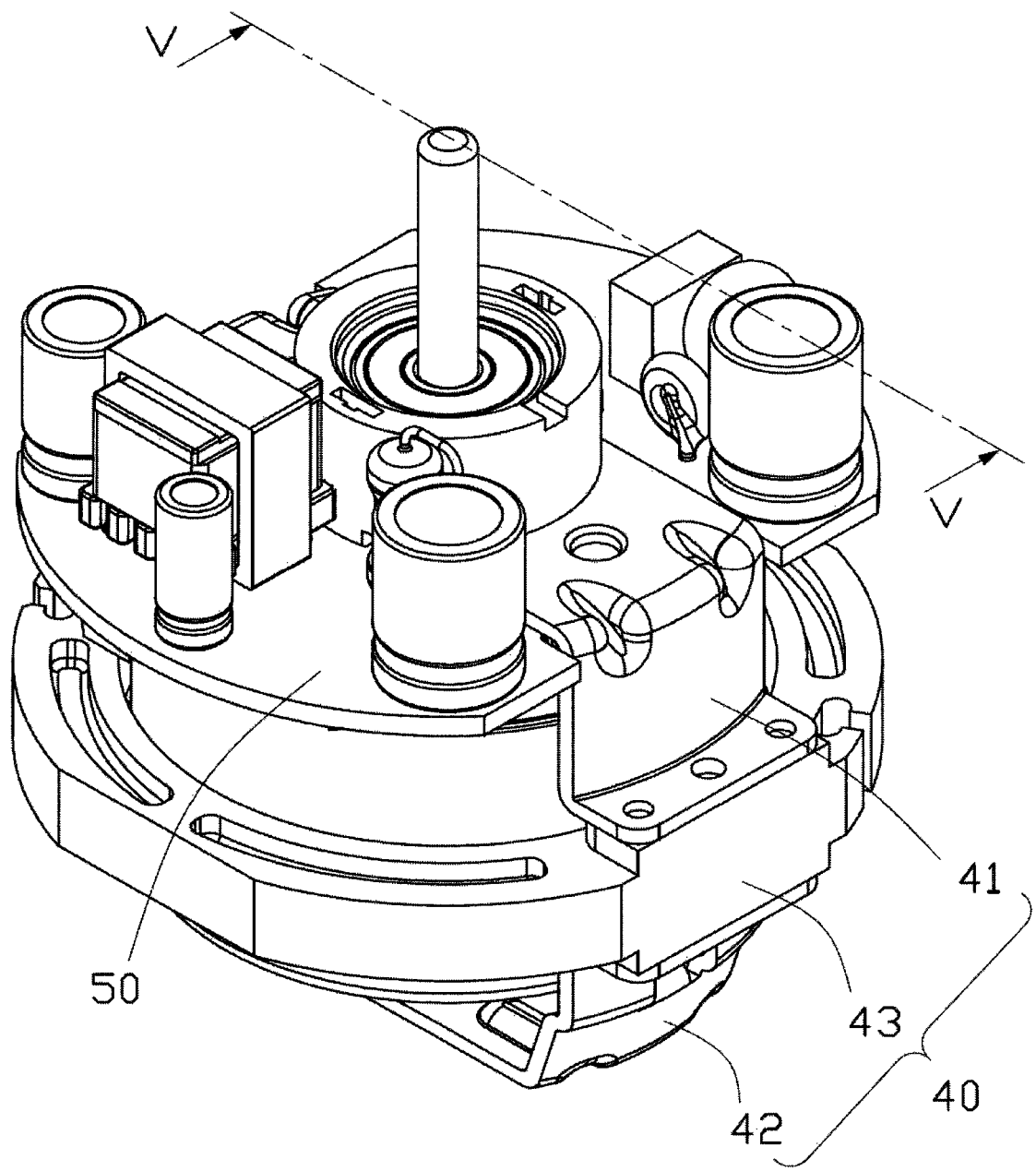
FIG. 1 is a perspective view of an electric motor according to one embodiment of the present invention.

Elements of similar structures or functions are generally represented by like reference numerals for illustrative purposes throughout the figures. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

Figure 2:
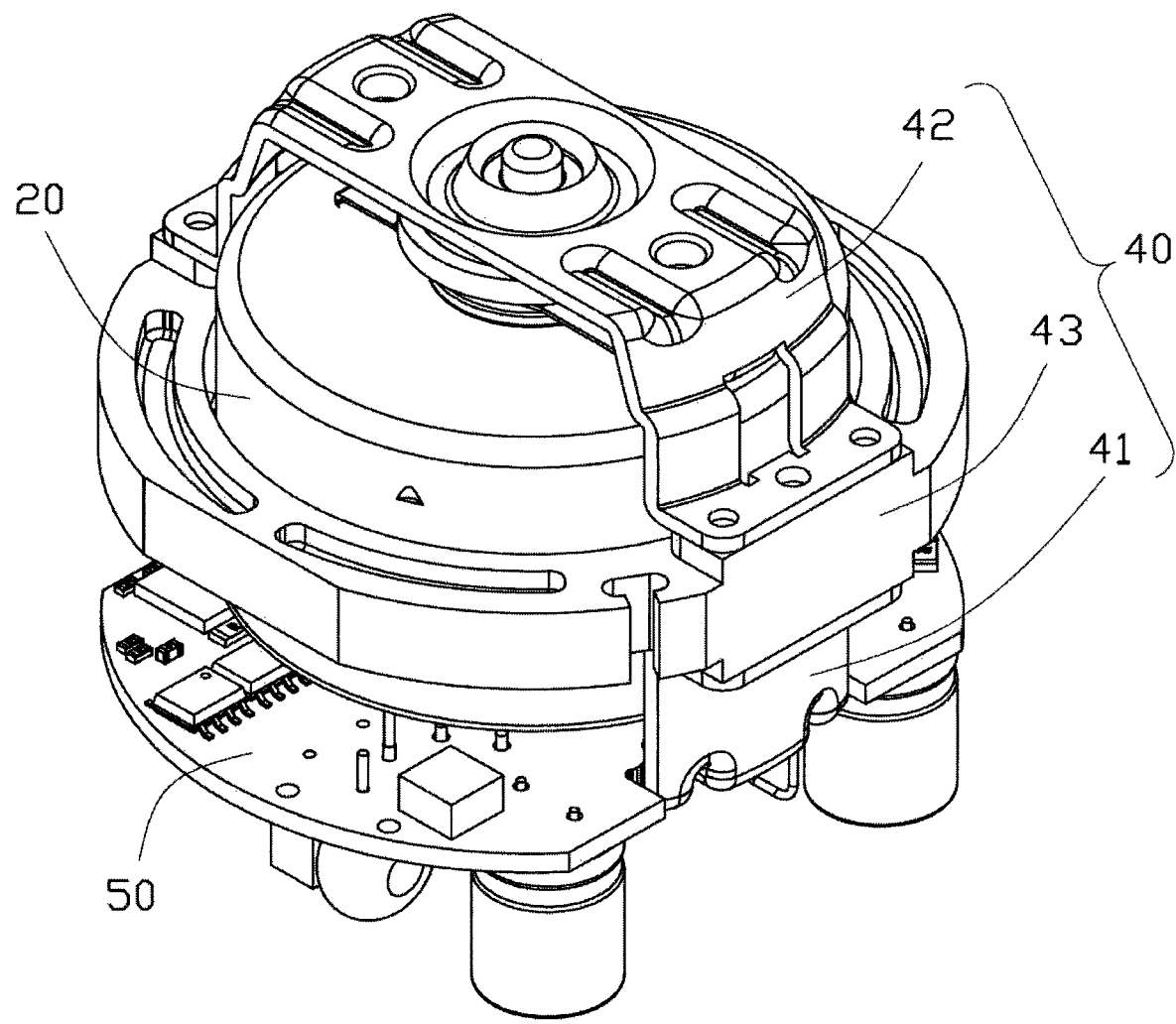
FIG. 2 is another perspective view of the motor shown in FIG. 1.

Referring to FIGS. 1 and 2, a brushless DC motor in accordance with an embodiment of the present invention is an outer rotor motor and includes a stator 10, a rotor 20 arranged radially outside the stator, a rotation shaft 30 driven by the rotor 20, a mounting seat 40 disposed outside the rotor 20, and a control board 50 disposed on the mounting seat 40.

Figure 3:
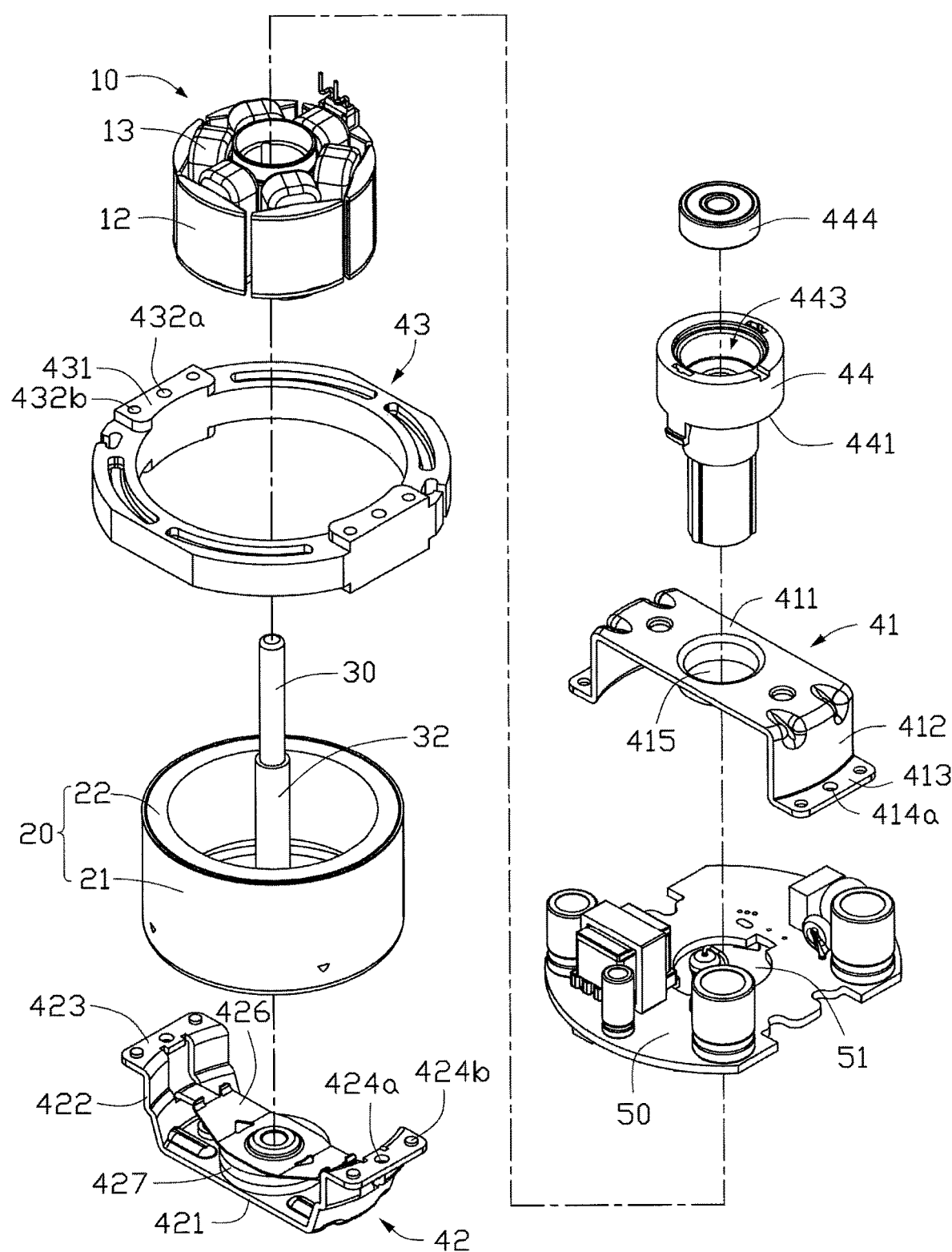
FIG. 3 is an exploded schematic diagram of the motor shown in FIG. 1.
Figure 4:
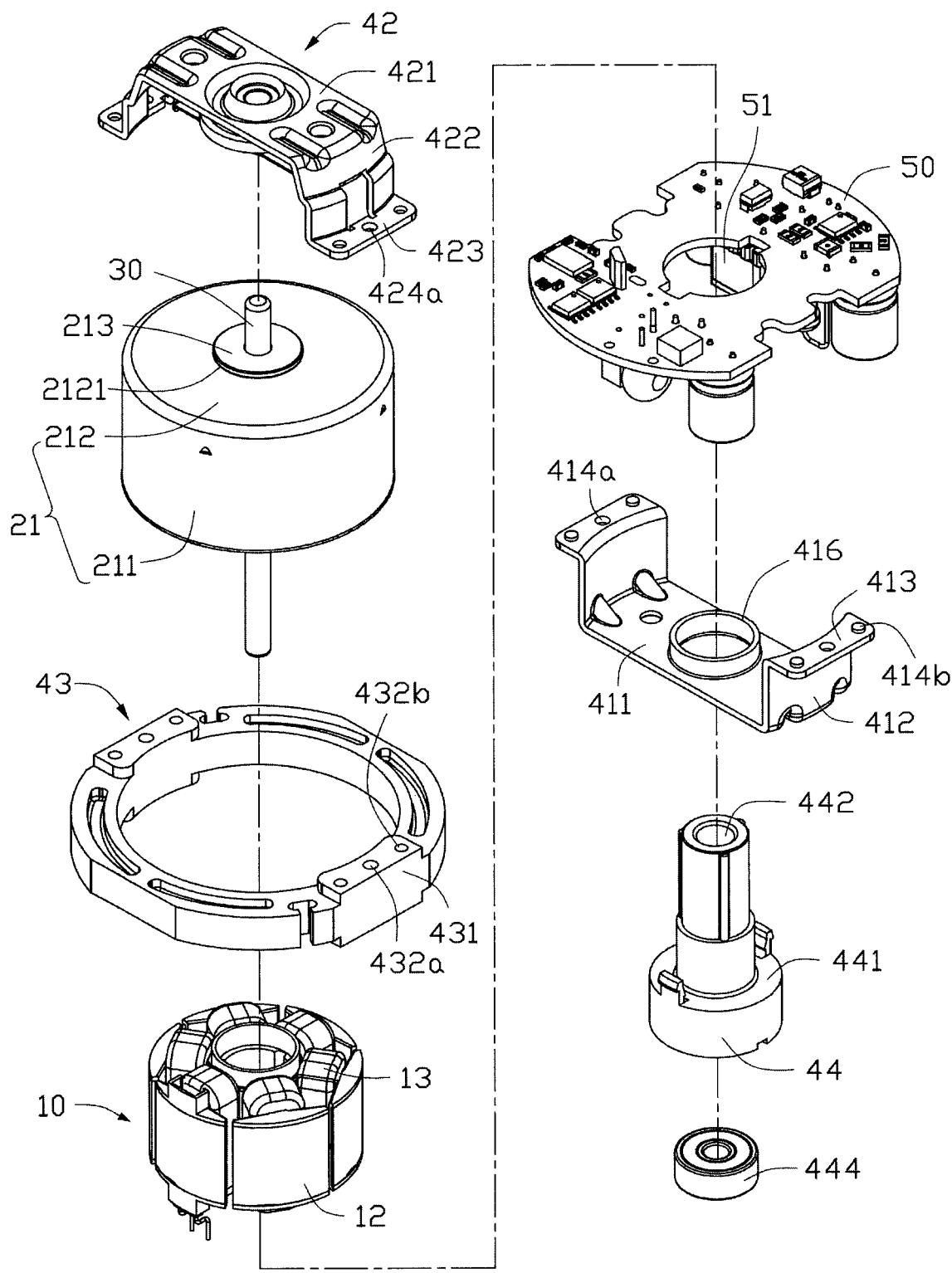
FIG. 4 is an exploded view of the motor shown in FIG. 1 from another perspective.
Figure 5:
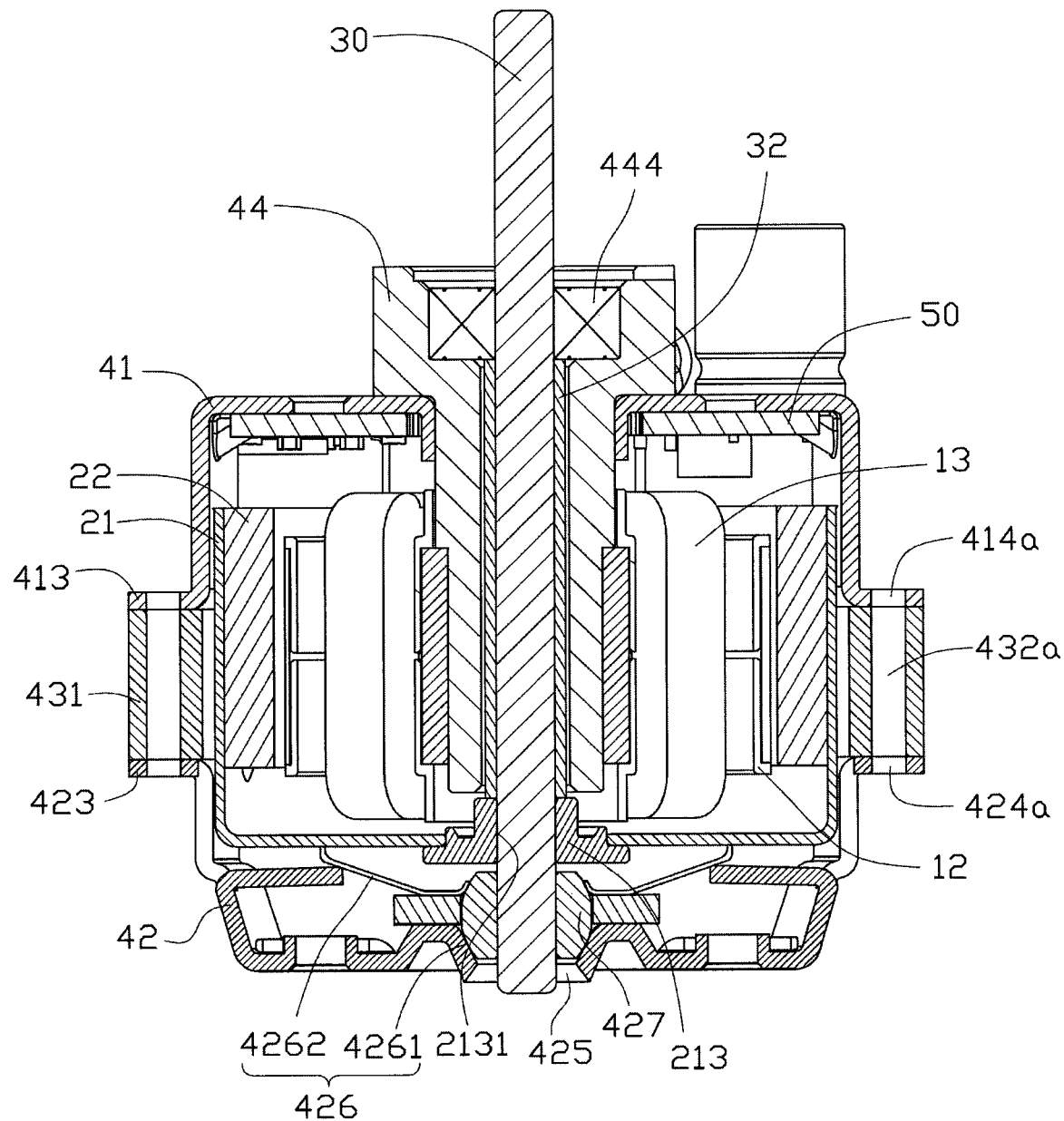
FIG. 5 is a schematic cross-sectional view of the motor shown in FIG. 1 along V-V.

Referring also to FIGS. 3-5, the stator 10 includes a stator core 12 and a stator winding 13 wound around the stator core 12. The rotor 20 includes a rotor holder 21 and a magnet 22 attached to the rotor holder 21. The rotor holder 21 includes a magnet mounting portion 211 and a connecting portion 212 connected to the magnet mounting portion 211. The magnet 22 is attached to the magnet mounting portion 211. The connecting portion 212 is fixedly connected with the rotation shaft 30 so as to enable the rotation shaft 30 to be synchronically rotatable with the rotor 20. Specifically, the magnet mounting portion 211 is a cylindrical portion and the connecting portion 212 is plate-like portion connected to an end of the magnet mounting portion 211. The connecting portion 212 defines a through hole 2121. The rotation shaft 50 fixed in the through hole 2121 of the connecting portion 212 with a locking ring 213, which is fixedly sleeved on the rotation shaft 50 and fastened in the through hole 2121. In present invention, The rotation shaft 30 is sleeved by a sleeve 32 made of plastic or rubber. The sleeve 32 has an length smaller than that of the rotation shaft 30 and opposite ends of the rotation shaft 30 extend out of sleeve 32. In assembly, the sleeve 32 is rotatably received in the mounting post 44 together with the rotation shaft 30. An end of the sleeve 32 extends out of the mounting post 44 to resist against the locking ring 213 and prevent the mounting post 44 from contacting with the locking ring 213 or any other portion of the lower bracket 42, and thereby being worn out in high speed rotation.

The mounting seat 40 includes an upper bracket 41, a lower bracket 42, a connecting member 43 and a mounting post 44. The upper bracket 41 and the lower bracket 42 are integrally connected by a connecting member 43. The connecting member 43 is to be circumferentially sleeved on the rotor 20. The upper bracket 41 and the lower bracket 42 are respectively located on two sides of the connecting member 43 and are disposed on opposite axial ends of the rotor 20. Specifically, the connecting member 43 is substantially annular and has two mounting stands 431 thereon. The upper bracket 41 includes a plate-like main portion 411, two wing portions 412 respectively extending from opposite end of the main portion 411 in same direction perpendicular to the main portion 411, and two mounting flanges 413 respectively formed at distal ends of the two wing portions 412. The lower bracket 42 is similar to the upper bracket 41 in shape, and also includes a plate-like main portion 421, two wing portions 422 respectively extending from opposite end of the main portion 421 in same direction perpendicular to the main portion 421, and two mounting flanges 413 respectively formed at distal ends of the two wing portions 422. The connecting member 43 is made of metal or plastics. The upper bracket 41 and the lower bracket 42 are sheet-metal parts formed by process such as punching. Each of the mounting flanges 413 of the upper bracket 41 is provided with a plurality of mounting holes 414a and an alignment protrusion 414b. Each of the mounting flange 423 of the lower bracket 42 is provided with a plurality of mounting holes 424a and an alignment protrusion 424b. Each of the mounting stands 431 defines a plurality of fixing holes 432a and an alignment hole 432b. In assembly, the alignment protrusions 414b and 424b are respectively fitted into the positioning holes 432a of the two mounting stands 431 to ensure the mounting flanges 413, 423 of the upper and lower brackets 41, 42 are properly aligned with the corresponding mounting stands 431 of the connecting member 43. Sequentially, Fasteners such as screws or rivets pass through the mounting holes 414a, 424a, and the fixing holes 432a to integrally fixed the upper bracket 41, the lower bracket 42 and the connecting member 43. In other embodiment, the upper bracket 41, the connecting member 43 and the lower bracket 42 can be fixed together by other connection means, for example, they may be fixed together by means of buckles or the like. The main portion 411 of the upper bracket 41 further defines a through hole 415 for the mounting post 44 passing therethrough and forms a boss 416 surrounding the through hole 415 for positioning the control board 50. Specifically, the boss 416 extends downward from main portion 411. The control board 50 defining a mounting hole 51 for the boss 416 extending therethrough and being fixed therein.

The mounting post 44 includes a large-diameter portion and a small-diameter portion co-axially connected with the large-diameter portion. A shoulder 441 is formed at an end adjoined the small-diameter portion. In assembly, the small-diameter portion of the mounting post 44 extends through and fixed in the through hole 415 of the upper bracket 41 by interference fit. The large-diameter portion of mounting post 44 is disposed at a side of the upper bracket 41 away from the lower bracket 42 and the shoulder 441 abut against the main portion 411 of the upper bracket 41. Therefore, the small-diameter portion of the mounting post 44 is disposed between the upper bracket and the lower bracket for the stator core 12 attached to and supported thereon. The mounting post 44 defines an axially-extending through hole 442 for the rotation shaft 30 extending therethrough. A bearing chamber 443 is defined in the large-diameter portion of mounting post 44 to receive a first bearing 444. The bearing chamber 443 communicates with the through hole 442. In one embodiment, the mounting post 44 is made of plastics by injection molding. The first bearing 444 is mounted in the bearing chamber 443 by interference fit. In other embodiment, the first bearing 444 can also be embedded in the mounting post 44 by over mold.

The lower bracket 42 defines a through hole 425 adapt for the shaft 30 rotatably extending therethrough. The lower bracket 42 further includes a retaining feature 426 to retain a second bearing 427 to the lower bracket 42 corresponding to the through hole 425. Specifically, the retaining feature 426 includes a depression 4261 defined in a top side of main portion 421 of the lower bracket 42 and a latching member 4262. The second bearing 426 is received in the depression 4261. The latching member 4262 press against a top of the second bearing 426 to retain the second bearing 426 in place. In different embodiments, the first bearing 444 and the second bearing 427 may be ball bearings or bushings.

In assembly, the first bearing 444 and the second bearing 426 cooperatively rotatably support the rotation shaft 30. Since the first bearing 444 is provided outside the upper bracket 41 and the second bearing 427 is provided on the lower bracket 42, both the first bearing 444 and the second bearing 427 are avoided overlapping the stator core 12 in the axial direction. The diameter of the mounting post 44 and the size of the stator core 12 can be reduced. The overall size of the motor can be reduced or the size of the teeth of stator core 12 can be increased to accommodate more coils of stator winding 13 and achieve greater power with the overall size of the motor kept the same as the traditional motor. In addition, since at least one bearing is avoided being mounted to the mounting post 44, the mounting post 44 can be made of cheaper material with lower strength and the machining accuracy can be lower. For example, the mounting post 44 can be injection molded part with a plastic material. Anyway, the cost of the manufacture can lowered. Furthermore, compared with the prior art, the installation of the bearings in the embodiment of the invention is more convenient.

In present embodiment, the mounting seat 40 includes upper bracket 41, lower bracket 42 and the connecting member 43, which are separately made parts and assembled with screwing or other connection means. The mounting seat 40 with this structure is easy for installation and durable. In addition, the control board 50 may be selectively mounted to the upper bracket 41, or the lower bracket 42 for different applications.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. An outer rotor motor comprising:
a stator comprising a stator core and a stator winding wound around the stator core;
a rotor rotatably disposed outside the stator;
a mounting seat comprising an upper bracket seated on one of opposite axial ends of the rotor, a lower bracket seated on the other axial end of the rotor, a connecting member connected between the upper bracket and the lower bracket, and a cylindrical mounting post fixed to the upper bracket, the cylindrical mounting post extending through and fixed in the stator core;
a rotation shaft driven by the rotor and rotatably extending through the cylindrical mounting post; and
two bearings mounted to the mounting seat to rotatably support the rotation shaft, the two bearings are avoided overlapping the stator core in the axial direction;
wherein the cylindrical mounting post comprises a large-diameter portion and a small-diameter portion co-axially connected with the large-diameter portion, the small-diameter portion is disposed between the upper bracket and the lower bracket, the stator core is attached to and supported on the small-diameter portion of the cylindrical mounting post, the large-diameter portion of mounting post is disposed at a side of the upper bracket away from the lower bracket, one of the two bearings is mounted in the large-diameter portion of the cylindrical mounting post.

2. The outer rotor motor of claim 1, wherein the upper bracket, the lower bracket and the cylindrical mounting post are respectively separately formed.

3. The outer rotor motor of claim 2, wherein the two bearing comprises a first bearing mounted to an end of the cylindrical mounting post at a side of the upper bracket away from the stator core, and a second bearing mounted to the lower bracket.

4. The outer rotor motor of claim 1, wherein the cylindrical mounting post is made of plastics by injection molding.

5. The outer rotor motor of claim 4, wherein the first bearing is embedded in the cylindrical mounting post by over mold.

6. The outer rotor motor of claim 1, wherein the upper bracket and the lower bracket are sheet-metal parts, the connecting member is made of metal or plastics.

7. The outer rotor motor of claim of 6, wherein
the upper bracket comprises:
a plate-like main portion,
two wing portions respectively extending from opposite end of the main portion in same direction perpendicular to the main portion, and
two mounting flanges respectively formed at distal ends of the two wing portions;
the lower bracket comprises:
a plate-like main portion,
two wing portions respectively extending from opposite end of the main portion in same direction perpendicular to the main portion, and
two mounting flanges respectively formed at distal ends of the two wing portions;
the connecting member is substantially annular and has two mounting stands thereon;
the mounting flanges of the upper bracket, the mounting flanges of the lower bracket, and the mounting stands of the connecting member are correspondingly fixed to each other.

8. The outer rotor motor of claim 7, wherein each of the mounting flanges of the upper bracket and the lower bracket defines a plurality of mounting hole; each of the mounting stands defines a plurality of fixing holes, the mounting flanges of the upper bracket, the mounting flanges of the upper bracket, and the mounting stands of the connecting member are correspondingly fixed to each other by a plurality of fasteners correspondingly passing through the mounting holes of the upper bracket, the mounting holes of the lower bracket, and the fixing holes of the connecting member.

9. The outer rotor motor of claim 3, wherein the lower bracket defines a depression in a side of main portion of the lower bracket facing the upper bracket, and is provided with a latching member, the second bearing is received in the depression, the latching member presses against a top of the second bearing to retain the second bearing in place.

10. The outer rotor motor of claim 1, wherein the rotor comprises a rotor holder and a magnet attached to the rotor holder, the rotor holder is unrotatably connected to the rotation shaft by a locking ring.

11. The outer rotor motor of claim 10, wherein the rotor holder comprises a magnet cylindrical mounting portion and a plate-like connecting portion connected to an end of the mounting portion, the connecting portion defines a through hole; the rotation shaft fixed in the through hole of the connecting portion with the locking ring fixedly sleeved on the rotation shaft and fastened in the through hole.

12. The outer rotor motor of claim 1, wherein the rotation shaft is sleeved by a sleeve having an length smaller than that of the rotation shaft, opposite ends of the rotation shaft extend out of sleeve.

13. The outer rotor motor of claim 12, wherein the sleeve is rotatably received in the cylindrical mounting post together with the rotation shaft; an end of the sleeve extends out of the cylindrical mounting post to resist against the lower bracket to prevent the cylindrical mounting post from contacting with the lower bracket and thereby being worn out in high speed rotation.

14. The outer rotor motor of claim 1, further comprising a control board selectively mounted to the upper bracket or the lower bracket.

15. The outer rotor motor of claim 1 is a brushless DC motor.

16. A motor comprising:
a stator comprising a stator core and a stator winding wound around the stator core;
a rotor rotatably disposed outside the stator;
a mounting seat comprising an upper bracket seated on one of opposite axial ends of the rotor, a lower bracket seated on the other axial end of the rotor, a connecting member connected between the upper bracket and the lower bracket, and a cylindrical mounting post fixed to the upper bracket, the cylindrical mounting post at least partially extending through and fixed in the stator core;
a rotation shaft driven by the rotor and rotatably extending through the cylindrical mounting post; and
wherein the cylindrical mounting post comprises a large-diameter portion and a small-diameter portion co-axially connected with the large-diameter portion, the small-diameter portion is disposed between the upper bracket and the lower bracket, the stator core is attached to and supported on the small-diameter portion of the cylindrical mounting post, the large-diameter portion of mounting post is disposed at a side of the upper bracket away from the lower bracket.

17. The motor as claimed in claim 16, wherein a bearing is mounted in the large-diameter portion of the cylindrical mounting post.

18. The motor as claimed in claim 16, wherein the upper bracket comprises:
a plate-like main portion defining a through hole for the cylindrical mounting post passing therethrough;
two wing portions respectively extending from opposite end of the main portion in same direction perpendicular to the main portion; and
two mounting flanges respectively formed at distal ends of the two wing portions.

19. The motor as claimed in claim 16, wherein the lower bracket comprises:
a plate-like main portion;
two wing portions respectively extending from opposite end of the main portion in same direction perpendicular to the main portion; and
two mounting flanges respectively formed at distal ends of the two wing portions;
the connecting member is substantially annular and has two mounting stands thereon;
the mounting flanges of the upper bracket, the mounting flanges of the lower bracket, and the mounting stands of the connecting member are correspondingly fixed to each other.

20. The motor as claimed in claim 16, wherein the lower bracket defines a depression in a side of main portion of the lower bracket facing the upper bracket, and is provided with a latching member, another bearing is received in the depression, the latching member presses against the second bearing to retain the second bearing in place.

* * * * *